US009116235B2

(12) United States Patent
Gelli et al.

(10) Patent No.: US 9,116,235 B2
(45) Date of Patent: Aug. 25, 2015

(54) MODE S ANTI-REFLECTION ALGORITHM FOR ELIMINATING FALSE TRACKS DUE TO REFLECTED REPLIES IN GROUND RADAR SYSTEMS

(71) Applicant: Selex Sistemi Integrati S.p.A., Rome (IT)

(72) Inventors: Stefano Gelli, Rome (IT); Stefano Rosati, Rome (IT)

(73) Assignee: SELEX ES S.P.A., Rome (IT)

( * ) Notice: Subject to any disclaimer, the term of this patent is extended or adjusted under 35 U.S.C. 154(b) by 86 days.

(21) Appl. No.: 13/689,967

(22) Filed: Nov. 30, 2012

(65) Prior Publication Data

US 2013/0265186 A1 Oct. 10, 2013

(30) Foreign Application Priority Data

Nov. 30, 2011 (IT) .............................. RM2011A0633

(51) Int. Cl.
| | |
|---|---|
| *G01S 5/02* | (2010.01) |
| *G01S 7/292* | (2006.01) |
| *G01S 7/41* | (2006.01) |
| *G01S 13/52* | (2006.01) |
| *G01S 13/78* | (2006.01) |
| *G01S 13/91* | (2006.01) |

(Continued)

(52) U.S. Cl.
CPC ................ *G01S 13/781* (2013.01); *G01S 7/02* (2013.01); *G01S 7/414* (2013.01); *G01S 13/782* (2013.01); *G01S 13/9303* (2013.01); *G01S 5/0215* (2013.01); *G01S 7/292* (2013.01); *G01S 7/2927* (2013.01); *G01S 13/52* (2013.01); *G01S 13/91* (2013.01)

(58) Field of Classification Search
CPC ................ G01S 5/0215; G01S 7/292–7/2928; G01S 7/414; G01S 13/52–13/528; G01S 13/66–13/726; G01S 13/781–13/788; G01S 13/91
USPC .............. 342/29–32, 36–40, 94–97, 159–164
See application file for complete search history.

(56) References Cited

U.S. PATENT DOCUMENTS

| | | | | |
|---|---|---|---|---|
| 3,705,402 | A | * 12/1972 | Ballantyne et al. ............. | 342/40 |
| 4,970,518 | A | * 11/1990 | Cole, Jr. .......................... | 342/37 |
| 5,107,268 | A | * 4/1992 | Sturm et al. .................... | 342/36 |

(Continued)

OTHER PUBLICATIONS

European Extended Search Report dated Mar. 13, 2013.

(Continued)

*Primary Examiner* — Peter Bythrow
(74) *Attorney, Agent, or Firm* — Hedman & Costigan, P.C.; James V. Costigan; Kathleen A. Costigan

(57) ABSTRACT

A Mode S anti-reflection method for eliminating false tracks due to reflected replies in ground radar systems, wherein the information contribution of the replies (at the level of raw video) is analyzed with the aim of calculating the position of the reflectors. The possible presence of ADS-B reports can be used, otherwise it will be effectuated a geometrical analysis of the distribution of the replies and will be compared with the plot(s) extracted by the radar sensor. The possibility of correlating along time the moving of the plots, their place of origin and average duration of the tracks generated by them will allow to understand whether the plot is relevant to a reflection or not. In the case of "reflection", a reflectors map is updated automatically in order to avoid the enabling of the initialization of the track in that area.

11 Claims, 10 Drawing Sheets

(51) Int. Cl.
  *G01S 13/93* (2006.01)
  *G01S 7/02* (2006.01)

(56) References Cited

U.S. PATENT DOCUMENTS

| | | | |
|---|---|---|---|
| 5,208,591 A * | 5/1993 | Ybarra et al. | 340/961 |
| 5,264,853 A * | 11/1993 | Sturm et al. | 342/30 |
| 5,406,288 A * | 4/1995 | Billaud et al. | 342/37 |
| 5,455,586 A * | 10/1995 | Barbier et al. | 342/37 |
| 5,463,398 A * | 10/1995 | Young | 342/46 |
| 5,477,225 A | 12/1995 | Young | |
| 5,528,244 A * | 6/1996 | Schwab | 342/37 |
| 5,793,326 A * | 8/1998 | Hofele | 342/93 |
| 5,877,721 A | 3/1999 | Tsang | |
| 5,990,824 A * | 11/1999 | Harrison | 342/160 |
| 6,473,027 B1 * | 10/2002 | Alon | 342/37 |
| 7,132,982 B2 | 11/2006 | Smith | |
| 7,508,336 B2 | 3/2009 | Leskiw | |
| 8,259,000 B2 * | 9/2012 | Fiori et al. | 342/93 |
| 8,405,540 B2 * | 3/2013 | Porikli | 342/90 |
| 2002/0021247 A1 | 2/2002 | Smith | |
| 2002/0180631 A1 * | 12/2002 | Alon | 342/37 |
| 2004/0233095 A1 * | 11/2004 | Galati et al. | 342/37 |
| 2005/0195104 A1 * | 9/2005 | Liebscher et al. | 342/191 |
| 2006/0132354 A1 * | 6/2006 | Beard et al. | 342/160 |
| 2007/0024494 A1 | 2/2007 | Dizaji | |
| 2008/0036659 A1 * | 2/2008 | Smith et al. | 342/454 |
| 2008/0111730 A1 * | 5/2008 | Ding et al. | 342/90 |
| 2008/0231493 A1 * | 9/2008 | Billaud et al. | 342/32 |
| 2009/0140909 A1 * | 6/2009 | Wood et al. | 342/27 |
| 2011/0241927 A1 * | 10/2011 | Porikli | 342/90 |

OTHER PUBLICATIONS

Italian Patent Office Written Opinion in corresponding application with pp. 4-6 in English, dated Jul. 25, 2012.

* cited by examiner (a)

(b)

(c)

(d)

MODE S ANTI-REFLECTION ALGORITHM FOR ELIMINATING FALSE TRACKS DUE TO REFLECTED REPLIES IN GROUND RADAR SYSTEMS

The present application claims priority to Italian Patent Application No. RM2011A000633, filed on Nov. 30, 2011, which is incorporated herein by reference in its entirety.

FIELD

The disclosure relates to a Mode S anti-reflection algorithm for eliminating false tracks due to reflected replies in ground radar systems.

The Mode S is a technology for data transmission utilised by the second surveillance radar (SSR) for the control of the air traffic of aircrafts provided with transponder. The "S" stands for "selective" i.e. it indicates the possibility of interrogating the aircraft in a selective way by means of univocal 24-bits address, possibility that is not offered by the prior technologies called "mode A" (or "Mode 3") and "Mode C".

The mode S is a standard of communication complying with regulations and recommendations of the ICAO, International Civil Avionic Organisation, i.e. the body entrusted for developing the principles and techniques of the international air navigation, the routes and the airports and promoting the design and the development of the International air transport making it more secure and regular.

The mode S data link is characterised by this activity of the data exchange between ground radar station and aircraft.

The characteristic of the technologies prior to mode S in the field secondary radars is that of effectuating transmission of the broadcast type, by exploiting:

the spatial selectivity of the radar antenna (dimension of the main beam of around 2.4°);

the presence of a beam purposely studied for the suppression of the lateral lobes both in "uplink" (ISLS) and in "downlink" (RSLS) to resolve the aircrafts very close to each other.

With "uplink" it is meant the connection between a ground terminal and an air position, with "downlink" the opposite connection.

Since the interrogations generated by the radar are not addressed specifically to an aircraft, the targets in the main beam respond always with a reply that can, hence, arrive at the radar antenna as superimposed to other replies (of other aircrafts) and distorted by it (phenomenon known with the name of "garbling").

Moreover, since the transmissions of radar cannot be distinguishing from those of another interrogator in the same area, effects of mutual interference between ground systems are created. Therefore a useful reply, i.e. generated by the interrogation of the secondary radar, can find itself "immersed" in a set of replies which are instead generated by other adjacent radars (phenomenon known with the name of "fruiting").

The increase of the air traffic, especially in the central European area ("core area"), and the proliferation of ground stations has led the traditional system at the boundary of its potential performances and to the necessity of introducing a selective ground-onboard-ground interrogation system.

In the protocol of Mode S, standardised in ICAO Annex 10, Vol. IV, the address allocated to the radar is defined as IC, "Interrogator Code", or II "Interrogator Identifier", whilst that of the target is defined as Mode S Address or even "ICAO 24 bit Address".

The address of the ground station is not necessarily univocal, even in a relatively restricted area (200×200 nautical miles) and assumes values ranging from 0 to 16 (some of which are reserved for testing or military aims). On the contrary, the address of the target is assigned directly by a national body within a set of addresses that ICAO assigns, worldwide, to each country.

Therefore, the basic requirement of the mode S protocol is that the mode S address be "discrete", i.e. that the hypothesis that two aircrafts with the same mode S address cannot exist in the area covered by an only radar is valid.

As in other traditional radar systems, there is here the problem of discriminating between real and false targets generated by the reflection of the replies against natural or artificial obstacles.

Although the Mode S address is theoretically discrete, there exist surveys, studied and published by EUROCONTROL, dealing with examples of aircrafts with equal Mode S Addresses. The cause of such a phenomenon is typically connected to the transfer of the aircrafts from an airline to another one and the non-programming of the onboard transponder address. In the civil aircrafts, indeed, the pilot cannot accede to the programming of the mode S address on the transponder and moreover, being the mode S address a "technical" address, it is not explicitly presented to the flight controller.

The presence of aircrafts with the same mode S address makes therefore the typical Mode S traditional algorithm unusable and even harmful, falling back to the general problem of the prior connections, wherein in addition to the replies due to natural targets, there are replies due to the non-univocity of the air codes.

The classical solution to the above described problem is that of utilising the other conditions for the detection and the consequent elimination of the undesired targets created by the radar extractor as a consequence of the replies reflections against the reflectors (natural or artificial objects different from the aircraft target).

The usable parametres, individually or in combination among them, are the following:
mode S address (for example: 0x30000 F);
mode A (for example A1234);
"Call Sign" (and identifier that is unique for each flight, for example: AZ3581);
comparison with pre-defined reflectors maps.
Unfortunately each of these parameters, in Mode S, comes out to be unreliable because:
the mode S address, as above said, cannot be univocal;
the mode A, in the Mode S aerial space, is the same for all the aircrafts ("conspicuity code A1000"); moreover, this is not always present in all the replies (but only in some selective interrogations called "ROLL CALL" and effectuated at the moment of initialisation of a track or when the same is not confirmed by new radar detections for a certain time) and, particularly, the mode S acquisition protocol tends to restrict the number of Mode A interrogations towards a flight;
the call sign is theoretically univocal, but it is set by the pilot and, therefore, could be wrong because of a typing error. The frequency of such errors is relatively high. Moreover also the call sign is not present in all the replies;
finally, the comparison with the reflectors maps is a very effective method, even if there exists a practical objective difficulty in the definition of a sufficiently defined map and in the updating thereof.

The flow chart of the above mentioned anti-reflection algorithm can be schematically represented as in FIG. 1.

In the practice however, the combination of the above mentioned decision criteria, i.e. the result of the described algorithm, cannot be considered as wholly effective.

Document US20020180631 discloses a similar method, wherein a cinematic analysis is performed on tracks that have a valid mode code to update a reflectors map. However, in a Mode S SSR environment (air space) the so-called conspicuity code will be adopted, that is all the aircrafts equipped with mode S transponders will share the same identical Mode A code (A1000) to prevent mode A leakage due to the proliferation of air traffic. Therefore the algorithm of US20020180631 would delete all the Mode S flights.

It is object of the present disclosure to provide a method for eliminating the flase tracks in the radar detections, which solves the problems and overcomes the drawbacks of the prior art.

It is an object of the present invention to provide means and systems configured to perform the method that is the object of the present disclosure.

SUMMARY

According to a first aspect of the disclosure, a method for eliminating false Mode S SSR or 3A code tracks on radar display created by a radar extractor of a radar as a consequence of false replies, i.e. replies reflections against reflectors, a reflector being natural or artificial object different from an aircraft target, the radar comprising the radar extractor and a radar tracker, the method comprising the execution of the following steps:
A. Creating a raw video map, that is extended to the area covered by the radar and is subdivided into cells of pre-definable dimensions, each cell delimiting a portion of the area wherein a aircraft target can be present, to each cell being associated a probability of presence of false replies in such a cell;
B. For a situation corresponding to a scan by the radar:
  B0. Identifying replies clusters, i.e. two or more replies sets closer to each other in azimuth and range than corresponding predefined threshold values;
  B1. Associating to each cell of the raw video map a power level received by the radar in the corresponding area portion;
  B2. Extracting the plots, i.e. replies cluster average points determined in case a replies set has a number of replies greater than a pre-defined threshold, by the radar extractor;
  B3. Sending the extracted plots to the radar tracker along with said probability of presence of false replies in the cells to which they respectively belong;
  B4. Calculating, by means of the radar tracker, the tracks relevant to the plots, updating the already existing tracks on the radar display and initiating new tracks using one or more track initiation thresholds chosen on the basis of said probability of presence of false replies calculated in step B3;
C. With respect to the all tracks of step B4, determining, by means of the radar tracker, false tracks and relevant initial points (in fact, the radar tracker determines the presence of false tracks by using several criteria, the disclosure method concentrating on avoiding to initiate false tracks and not on the particular method of discovering false tracks, which can vary with the progress in the field);
D. On the basis of the initial points of the false tracks determined in step C, calculating the probability of presence of said false replies in the cells corresponding to said initial points and updating the raw video map of step A;
E. Repeating steps B-D.

A scan of the radar is the detection of the radar detection in a certain time window.

The definition of plot given in B2 is the standard definition known to the skilled person. It follows that the number of plots are not necessarily equal to the number of clusters.

For example, concerning step B4, the threshold can be the number of correlating consecutive plots needed to initiate the track. Such a number can be chosen proportionally to said probability of presence. The skilled person will understand how to use such a probability of presence with respect to the different track initiation criteria.

According to another aspect of the present disclosure, in step B4, a track initiation threshold is used, which is a pre-defined number of correlating consecutive plots, said track initiation threshold being an increasing function of said probability of presence of false replies calculated in step B3.

According to another aspect of the present disclosure, the power level associated to each cell in step B1 is determined by the intensity of the reply signal(s) within the cell, said probability of presence for the cell being calculated over multiple radar scans as:

$$E\{P^i_{RX} * N_{scan\ with\ reflection} / P_{MAX} * N_{scan\ TOT}\}$$

wherein:
  $N_{scan\ with\ reflection}$ is the number of radar scans for which false tracks have been determined in the cell in step C;
  $N_{scan\ TOT}$ is the number of multiple radar scans;
  $P^i_{RX}$ indicates the power of the signal received from the i-th reply falling in the cell, with i=1, ... k where k is the total number of replies in the cell and depends on the geographical extension of the same cell;
  $P_{MAX}$ indicates the highest power receivable from the cell;
And wherein $E\{\ \}$ indicates an average operation executed on the replies in the cell.

According to another aspect of the present disclosure, said probability of presence in each cell is calculated as a percentage of the current average power stored in the cell $P_r^n$:

$$P_{fi} = b P_r^n$$

wherein b is a configurable parameter.

According to another aspect of the present disclosure, in step B1, for each cell, the power level received in the current scan $P_r$ is averaged with a power level $P_r^{n-1}$ already associated to the cell, and an averaged value $P_r^n$ is currently associated to the cell, according to the following:

If $P_r \geq P_r^{n-1}$, then $P_r^n = P_r$

Else $P_r^n = \alpha P_r + (1-\alpha) P_r^{n-1}$

Wherein $\alpha$ is a real number weight, equal for all cells, parametrising a "memory" of cell average power that affects the one or more track initiation thresholds in step B4, the value $\alpha$ being suitable to be pre-set to meet changing detection situations such as traffic density and environment changing speed, and, once a track has been identified as false in step C, $\alpha$ value will be set to a different value $\alpha_r < \alpha$ to increase algorithm memory of the false track.

According to another aspect of the present disclosure, in step C the radar tracker determines false tracks on the basis of one or more pre-defined criteria, a false track being determined when a track:
  has an unsteady trajectory defined by a variance of the range and/or azimuth speed larger than a pre-defined threshold;

is chosen out of two tracks having the same Mode S address and manoeuvering at the same time, wherein manouvering condition is estimated according to the innovation energy criterium of the Kalman filtering, by calculating the range distance between the two tracks and using following choice criteria:
  if said range distance is larger than a pre-defined range distance threshold, particularly radar range accuracy, the track with the largest range distance is chosen;
  otherwise the track is chosen that is the first track terminated in time;
The false track is the one of two tracks having the same mode S address, for which the roll call interrogations do not succeed;
Is chosen by an operator who manually inputs information in the radar tracker about which one of the tracks are false tracks.

According to another aspect of the present disclosure, during step D, the radar tracker communicates the initial points of the false tracks individuated in step C to the radar extractor, which carries out the calculation of probability of presence.

According to another aspect of the present disclosure, during step A, when the system ADS-B is at disposal, in case an ADS-B plot is present which is correlating in position with a SSR plot, all the remaining plots will be marked as reflections and the relevant cells of the raw video map will be marked with probability 100%.

It is further specific subject-matter of the present disclosure a computer program characterised in that it comprises code means configured to carry out, when operating on a computer, step A-E of the method for eliminating false Mode S SSR or 3A code tracks on radar display created by a radar extractor as a consequence of the false replies, according to according to the disclosure.

It is further specific subject-matter of the present disclosure a memory medium readable by a computer, having a program memorized on it, characterised in that the program is the computer program according to the disclosure.

It is further specific subject-matter of the present disclosure a system for eliminating false Mode S SSR or 3A code tracks on a radar display created by a radar extractor as a consequence of false replies, the system being characterised in that it comprises means to execute the method according to the disclosure, the system comprising:
  a radar extractor, including electronic means conFig.d to perform steps A, B0-B3, D;
  a radar tracker, including electronic means conFig.d to perform steps B4, C.

The details of one or more embodiments of the disclosure are set forth in the accompanying drawings and the description below. Further embodiments of the disclosure will be apparent from the description and drawings, and from the claims.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

In the system according to an embodiment in accordance with the disclosure, the algorithm for reflections elimination is based on the control of:
  mode S address or 3A code of the aircrafts, and
  reciprocal position of the aircrafts with equal mode S address or 3A code.

Therefore the algorithm is based on the mode S address or 3A code that is the only information that is present in all the mode S or 3A code replies. In the following we will refer mainly to the mode S, since it is the actual standard on European sky, but mode 3A and the like is equally possible within the disclosure.

The solution according to the present disclosure is that of cancelling one of the two tracks according to an exemplary process described in the following.

The proposed exemplary solution is that of using the raw video transformed into digital form, together with a set of predefined decision rules in order to charge automatically a reflectors map.

Such an algorithm, moreover, will be able to integrate the ADS-B reports to individuate the real position of the target and automatically construct (and keep up-to-date) the reflectors map.

For the sake of explanation completeness, ADS-B, Automatic Dependent Surveillance-Broadcast, is a co-operative technique for the control of air traffic (ATC) particularly useful for their identification of aircrafts and vehicles on the airport grounds in the viewpoint of traffic management in the airport and to avoid possible collisions in the absence of visibility or traffic congestion. Each aircraft is provided with a mode S transponder that is able to calculate its own GPS position and to send it periodically in the ether in such a way that special receivers of ADS-B typology be able to identify the position of the transmitting target.

The replies sent by each aircrafts within the observation time window defined by the azimuthal aperture of the antenna are integrated (correlated) in azimuth to define a so-called "plot" (detection) which corresponds to the positions of a possible target at a certain time instant.

Time sequences of plots showing a geometrical correlation complying with certain kinematic principles are aggregated into so-called "tracks", which present themselves on the video of the controller as symbols positioned in certain points (to which kinematic and identity information are associated).

Figure 1:
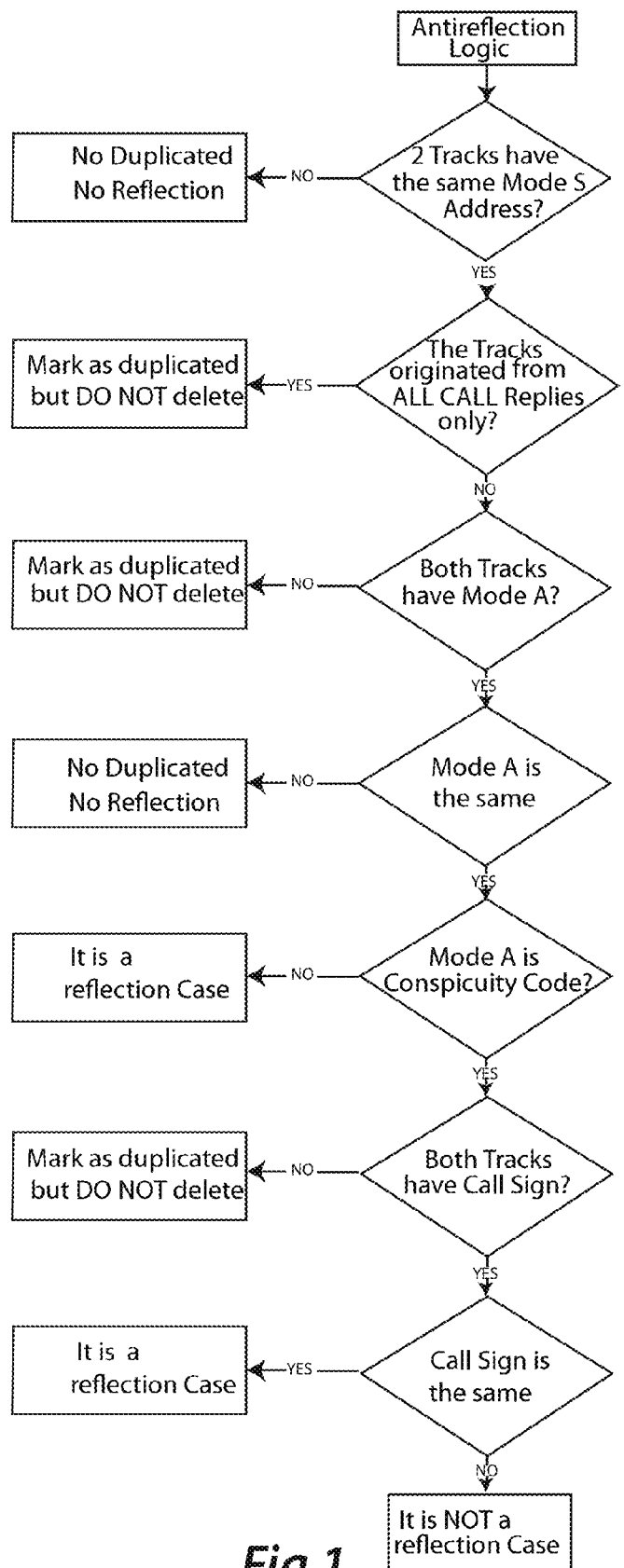
FIG. 1 shows the flowchart that is typical for a traditional antireflection mode S algorithm.
Figure 2:
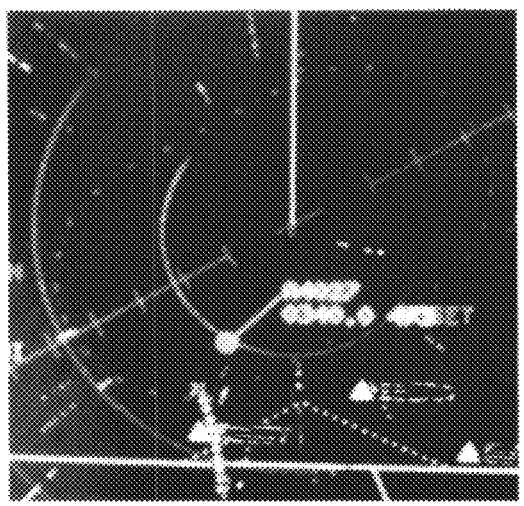
FIG. 2 shows an example of raw video without landing target (a) can and with take-off target (b, c, d, and d)
Figure 2:
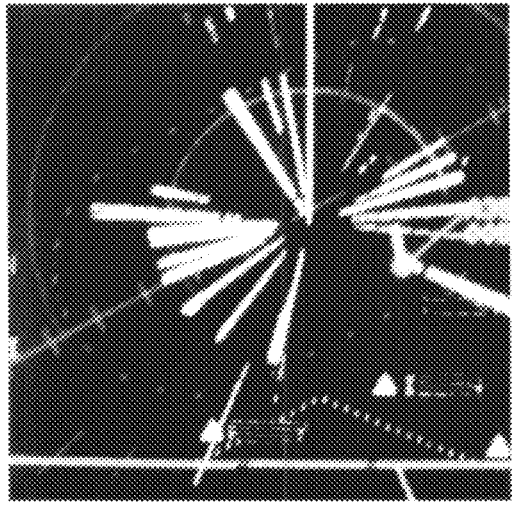
Figure 2:
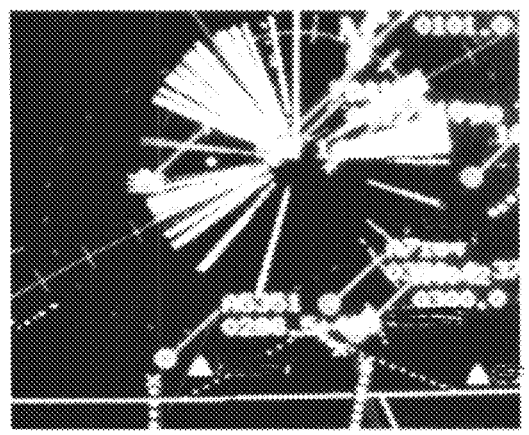
Figure 2:
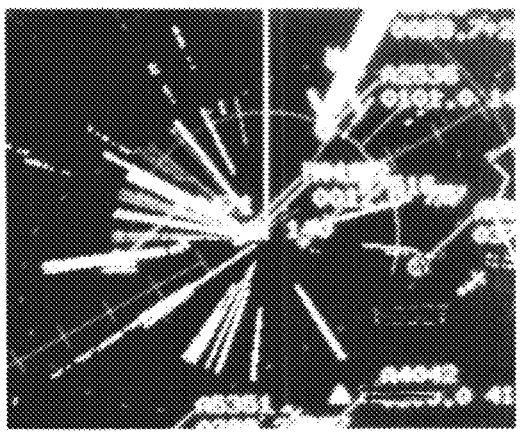

FIG. 2 represents the case of reflections connected to the presence of a hangar and tower in an operative site.

The white lines on the RMM ("Radar Maintenance Monitor") display represent the ALL CALL replies (in the mode S standard the replies are not addressed, and in this case they are called "ALL CALL", or they are selective, and in this case they are called "ROLL CALL") received by the radar by taking-off aircrafts (according to ICAO, Annex 10, Vol. IV, the aircraft on the ground should not emit ALL CALL replies, but even in this case, as for the mode S address and the Call Sign, there are many cases in which the international standard is not fully respected; since the mode S replies are longer than the conventional ones and, with respect to them, they transport a larger energetic contribution (PPM ("Pulse Position Modulation") modulation instead of amplitude modulation), the presence of so many replies in a complex environment like an airport implies serious degradations of the overall performance of the sensor). Incidentally a single target waiting on the runway generates very much replies (FIG. 2 (c)) that are absolutely false and frequently generate plots and, in some cases, false tracks.

The proposed algorithm will analyse the information contribution of the replies (at the level of raw video, i.e. before the process of the extraction of the plots) with the aim of calculating the position of the reflectors. The presence of ADS-B reports, if available, will allow to facilitate the analysis process, otherwise it will be effectuated a geometrical analysis of the distribution of the replies and will be compared with the plot (or the plots) extracted by the radar sensor. The possibility of correlating along time the moving of the plots, their place of origin and average duration of the tracks generated by them will allow to understand whether the plot is relevant to a reflection or not.

In the case the decision of "reflection" is taken, a reflectors map is updated automatically in order to avoid the enabling of the inizialization of the track in that area.

The first step of the process according to the disclosure is the geometrical identification of "clusters" having the same mode S Address, i.e. sets of replies that are close to each other in azimuth and range, according to a predefinable geometrical criterium (FIG. 2).

Subsequently, the clusters will be associated to the plots having the same mode S address (FIG. 3), because, clearly, here one proceeds to the identification of a true aircraft among tracks having the same mode S address, otherwise the distinction is immediate.

The so found clusters are reported on a map (Raw Video Map, RVM) that is subdivided into cells of predefinable dimensions, each one delimiting a zone wherein the target can be present. The map provides therefore a spatial localisation of all the replies of the target. To each cell, one will associate a parameter of energy level which is determined by the intensity of the replica signal(s) within the same cell.

Figure 8:
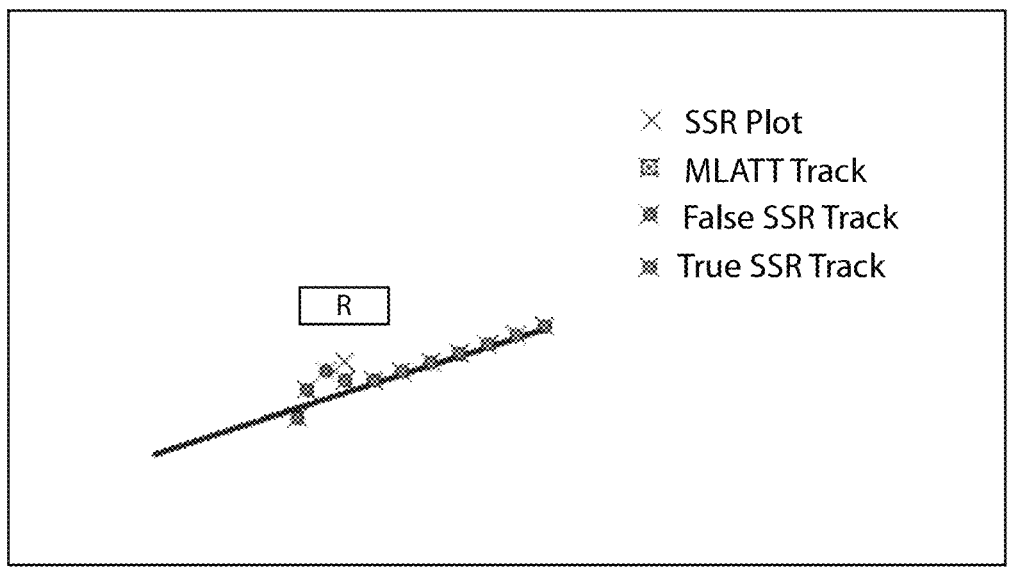
FIG. 8 shows an example of false tracks calculated on the basis of the replies time correlation and the duration of the track (which is evolving along time without geometrical criterium)

The tracks appearing in a cell will be analysed on the basis of the kinematic evolution of the tracks. For example, the criteria can be the following:

tracks that evolves during time in a random way without geometrical criterium: this will be a false track (see case of FIG. 8);

tracks that evolves during time with a geometrical criterium that is specular to another track: in such a case the shortest track is the false one.

Figure 3:
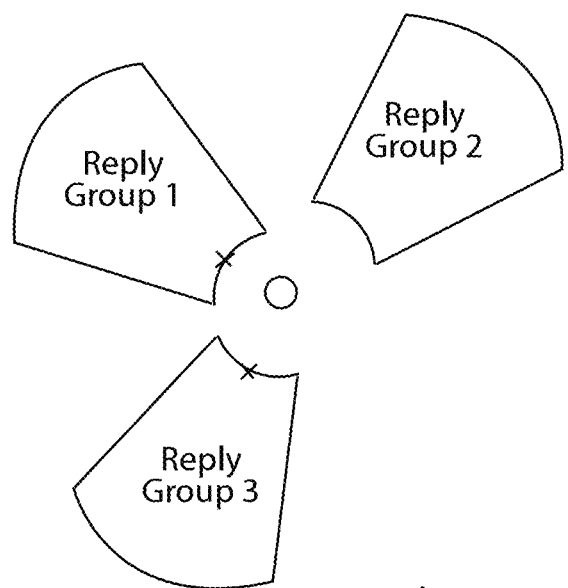
FIG. 3 shows an example of geometrical analysis of the row video.

The criterium can also be a manual entry by the operator. The cell will be updated accordingly. In the example of FIG. 3, the two groups of replies 1 and 3 generate two corresponding plot, a true one and another false one. The group of replies 2, instead, does not generate any plot. In this example one supposes that the plot generated by the replies group 1 be representative of a true aircraft.

Figure 4:
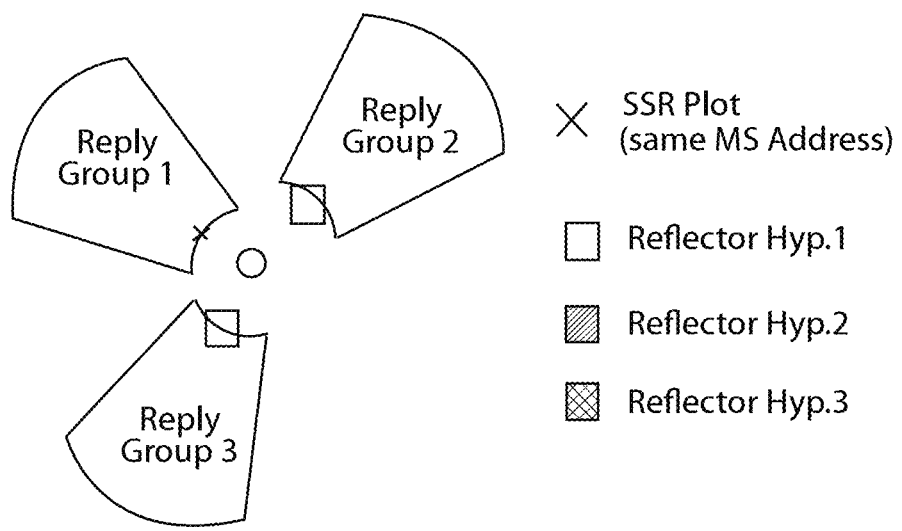
FIG. 4 shows a first hypothesis about the position of the reflectors in the raw video of FIG. 3.
Figure 5:
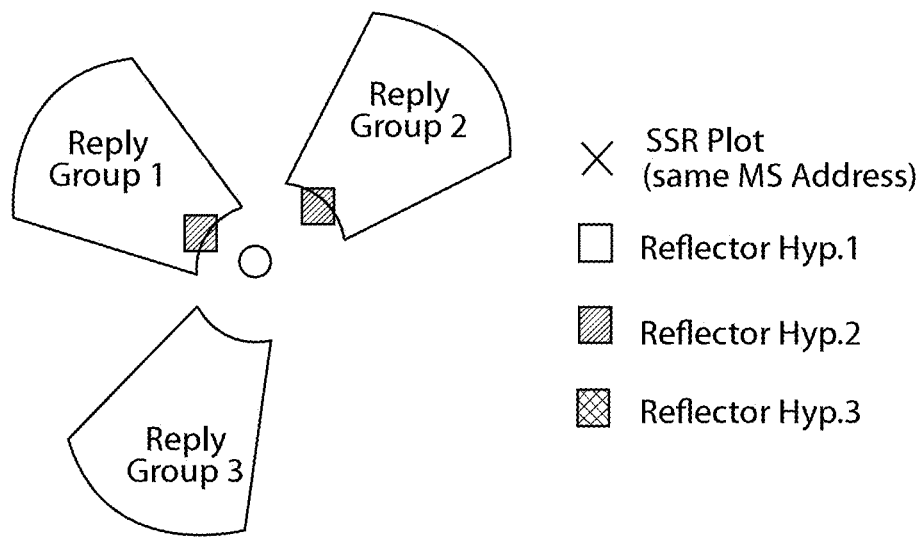
FIG. 5 shows a second hypothesis about the position of the reflectors in the raw video of FIG. 3.
Figure 6:
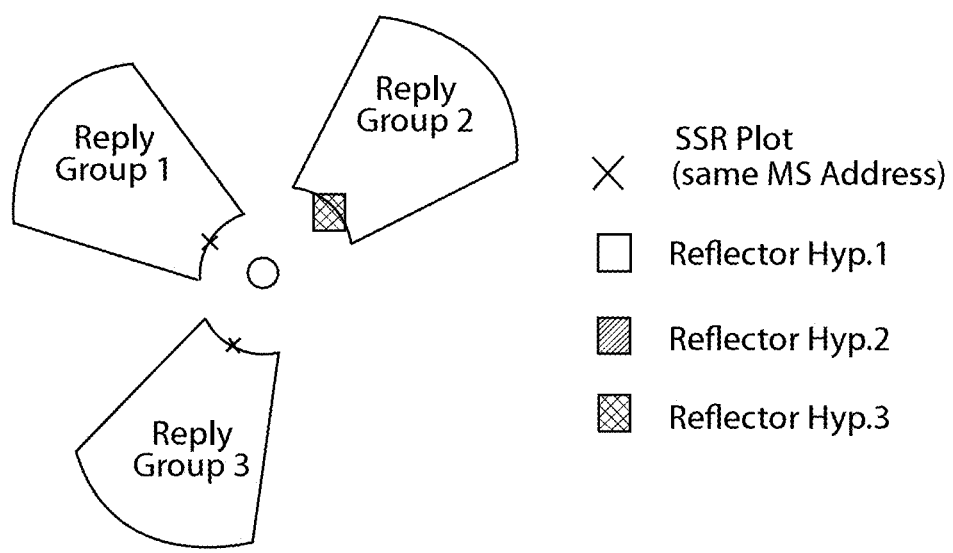
FIG. 6 shows a third hypothesis about the position of the reflectors in the raw video of FIG. 3.

The algorithm will take into account all the possibilities, i.e.:

hypothesis 1 (FIG. 4): the plot generated by the replies group 1 is the true one;

hypothesis 2 (FIG. 5): the plot generated by the replies group 3 is the true one;

hypothesis 3 (FIG. 6): the two plots are both ones true.

Figure 7:
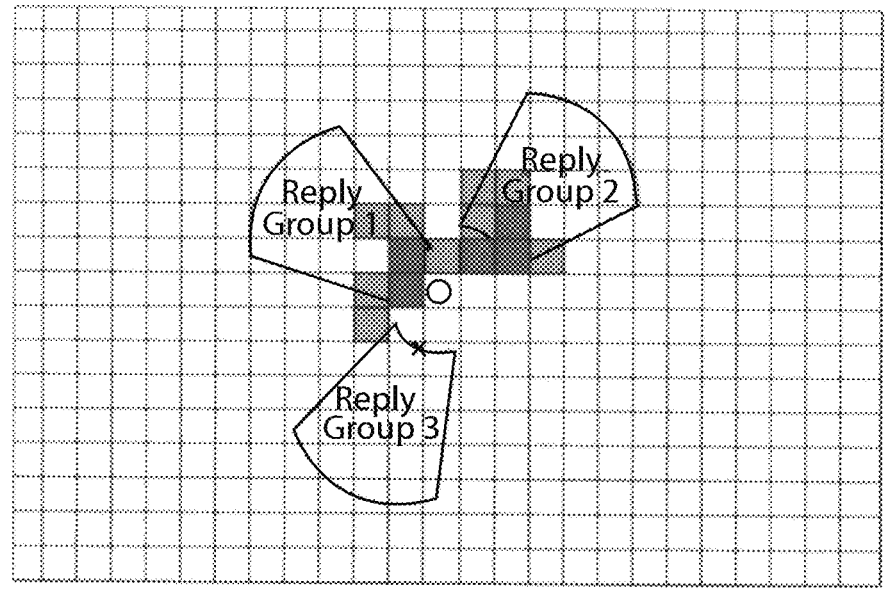
FIG. 7 shows an "RVM" updating in the case of the second hypothesis illustrated in FIG. 5.

Making reference to FIG. 7, consequent to the above-mentioned analysis, the above-mentioned RVM map will be updated, and, to each one of its cells, associated the following information:

probability of presence of a reflector;

origin position of the reflection.

The probabilistic contribution will be for example obtained by using the ratio:

$$E\{P^i_{RX} * N_{scan\ with\ reflection} / P_{MAX} * N_{scan\ TOT}\}$$

wherein:

$N_{scan\ with\ reflection}$ is the scans amount during which replies extractions occur;

$N_{scan\ TOT}$ is the total scans amount;

$P^i_{RX}$ indicates the power of the signal received on the i-th reply falling in that cell, with i=1, ... k where k is the total number of replies in the cell and depends on the geographical extension of the same cell;

$P_{MAX}$ indicates the maximum obtainable power from that distance (the "Sensitivity Time Control", STC, is corrected by the extractor, therefore the system according to the disclosure will not need to be configured to take it into account);

$E\{\ \}$ indicates the operation of average effectuated on the replies in a particular cell.

By doing so, the probability of having a reflection in that cell is determined both by the number of reflections detected and the average power of the signals received in that cell. Therefore, making an example, if within 10 scans 1 reflection is detected and the average power of the received signal is equal to the maximum power as obtainable from that distance, the probability of having another reflection will be of 10%. If instead, within the same 10 scans a reflection is detected but this has been generated by very weak signals with respect to the maximum theoretically obtainable, the probability will be lower. The introduction of a weight that is linked to the average power of the signal allows to compensate the effects due to double reflection without unbalancing the algorithm towards decisions of excessive cancellation and moreover it provides an adaptivity level to moving reflectors whose displacements are comparable to the observation time (for example: moving crane, trees moved by wind etc.).

The total scans number will be sufficiently higher than the time of permanency of an aircraft on the strip in order to decorrelate the observations (e.g.: Nscan TOT: 250 scans).

The algorithm according to the disclosure will take into account this probability in order to avoid the initialisation of a track that originates in a cell with high probability of false alarm, or to delay such an initialisation.

The origin position of the reflection will be evaluated on the basis of the assumed hypothesis, in the case of FIG. 3 it will be that corresponding to hypothesis 1. Obviously the RVM maps become therefore N, where N indicates the number of practicable hypothesis starting from the starting geometrical situation.

This is an important effect in the present disclosure, that allows to keep only the true tracks, and at the same time take into account the false ones for the updating of the RVM map, updating that will allow a better recognizing of the subsequent tracks.

In case one has at disposal the ADS-B system, then the position is sent by the aircraft and this allows to identify immediately the clusters generated by reflection and therefore to update immediately the map. It is here to be recalled that the ADS-B is an system alternative to the secondary radar, is dependent from the GPS system, with all the corresponding drawbacks.

In case a plot ADS-B is present that is correlating in position with a SSR plot, all the remaining plots will be marked as reflections and the relevant cells of the RVM map will be marked with probability 100%.

The presence of a ADS-B plot eliminates therefore all the RVM maps in the discarded hypothesis, therefore, as a matter of fact, it simplifies very much the implementation and the impact of the algorithm calculation according to the disclosure. The SIR-S extracts the ADS-B report.

Finally the output of the operative tracker will be projected onto the maps and, on the basis of predefined set of rules (tracks evolving in randomic/specular manner etc.) will be decided whether the track was a reflection or not.

In the example of FIG. 8, an object standing on the taxiway generates reflections. Since the speed estimate of a standing vehicle is subjected to very high errors, the filter that inhibits the inizialization of new tracks and is based on the minimal speed does not become operative, and a track is generated, which follows a randomic path (Randomic Path Rule). Afterwards, it exits the reflection area, loses replies contributions and the plot dies. The lifespan of the truck, as measured in a number of scans, and the kinematic randomness will be indicators of a reflected track.

Figure 9:
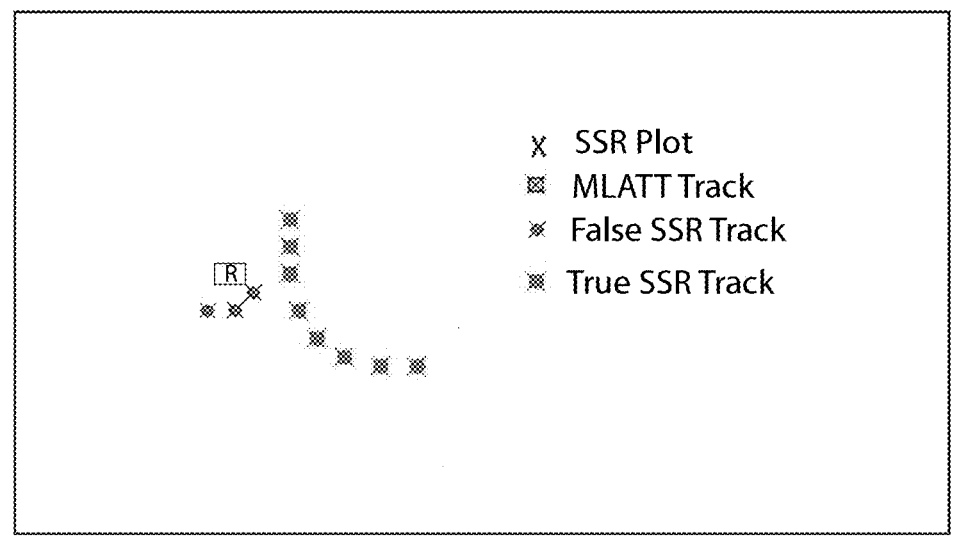
FIG. 9 shows an example of false track calculated on the basis of the time correlation and duration of the track (which evolves along time with the geometrical criterium which is specular to another track)

In the example of FIG. 9, instead, a flying target effectuates a manoeuvre but a reflector generates a target having specular or quasi-specular kinematic characteristics.

Even in this case the reflected track will be terminated after few scans, i.e. as soon as the conditions of reflection will become lacking because of the aircraft movement. The analysis of the track path with respect to the original one will be indicators of the presence of a reflected track (the false track will extinguish itself before).

Here also the ADS-B report will allow to identify unambiguously the true target from the false one. It is clear that the system of the present disclosure will apply conveniently to the case in which the ADS-B reports are not always available, otherwise the recognition is unambiguous.

Figure 10:
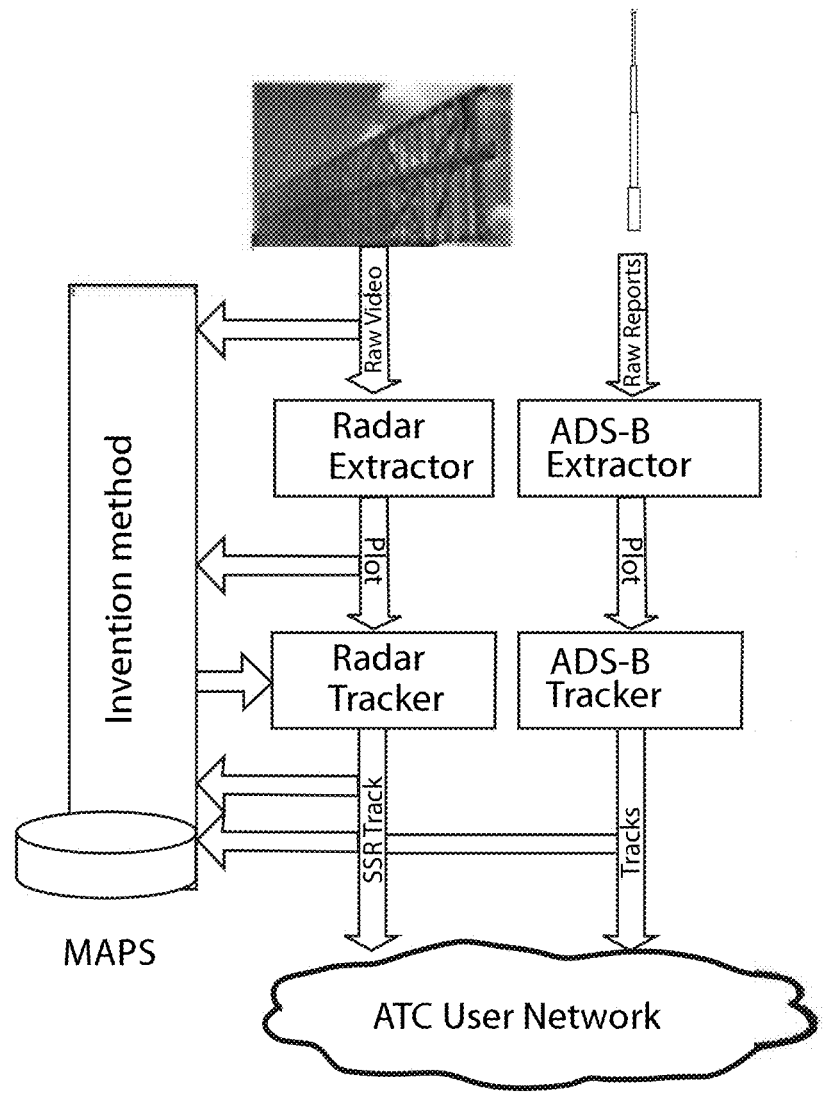
FIG. 10 shows a block diagram in an embodiment of the system according to the disclosure.

The comparison between the RVM and the "rule-based" remarks on the tracks will allow the identification of the reflection and cancellation thereof or to indicates that it deals with the reflected track (red arrow in FIG. 10).

DETAILED EXAMPLE

This example describes the operating steps of the method according to the disclosure in a realistic scenario.

3.1 RVM Description—Scenario Definition

The scenario is outlined from the "radar point of view", therefore radar extractor output is described in the following for several scans. Tracker output is described in terms of tracks, assuming that:
  The track initiation threshold is set to 2 (two plots needed to initiate a stable track);
  The track termination threshold is set to 2 (two consecutive missings to terminate a track).

The exemplary results during the steps of radar recognition (which are given as input to the disclosure method) are for example as follows:

Radar Scan 0—Radar radiation is switched on;

Radar Scan 1—Radar extracts two "real" plots (namely $P_A^1$ and $P_B^1$), i.e.: two plots generated by the detection of real targets A, B;

Radar Scan 2—Radar extracts two "real" plots (namely $P_A^2$ and $P_B^2$), again generated by the detection of real targets A, B.

Radar Scan 3—Radar extracts three plots (namely $P_A^3$, $P_B^3$ and $P_{AR}^3$). $P_{AR}^3$ is the plot generated by a reflector upon reception of the signal coming from target A.

Radar Scan 4, 5, 6—Radar extracts three plots all correlating from a kinematic point of view and, therefore, creating a track.

Radar Scan 7, 8—Radar extracts only two plots.

Radar Scan 9—Tracker terminates the track given by $P_{AR}$ plot sequence informing the radar extractor that it was a false track (i.e.: matched one of the false track identification criteria).

The following table summarises the procedure with the results of the example.

TABLE 1

| Radar Scan | Plot Output | Tracker Output |
|---|---|---|
| Radar Scan 0 | No plots | No tracks |
| Radar Scan 1 | $P_A^1$ and $P_B^1$ | No tracks |
| Radar Scan 2 | $P_A^2$ and $P_B^2$ | No tracks |
| Radar Scan 3 | $P_A^3$, $P_B^3$ and $P_{AR}^3$ | $T_A$ and $T_B$ |
| Radar Scan 4 | $P_A^4$, $P_B^4$ and $P_{AR}^4$ | $T_A$ and $T_B$ |
| Radar Scan 5 | $P_A^5$, $P_B^5$ and $P_{AR}^5$ | $T_A$, $T_B$ and $T_{AR}$ |
| Radar Scan 6 | $P_A^6$, $P_B^6$ and $P_{AR}^6$ | $T_A$, $T_B$ and $T_{AR}$ |
| Radar Scan 7 | $P_A^7$ and $P_B^7$ | $T_A$, $T_B$ and $T_{AR}$ |
| Radar Scan 8 | $P_A^7$ and $P_B^7$ | $T_A$, $T_B$ and $T_{AR}$ |
| Radar Scan 9 | $P_A^7$ and $P_B^7$ | $T_A$ and $T_B$ |
| Radar Scan 10 | $P_A^7$ and $P_B^7$ | $T_A$ and $T_B$ |
| Radar Scan 11 | $P_A^7$ and $P_B^7$ | $T_A$ and $T_B$ |

3.2 RVM Description—RVM Size

Now the creation and updating of the RVM map according to the disclosure is described.

Figure 11A:
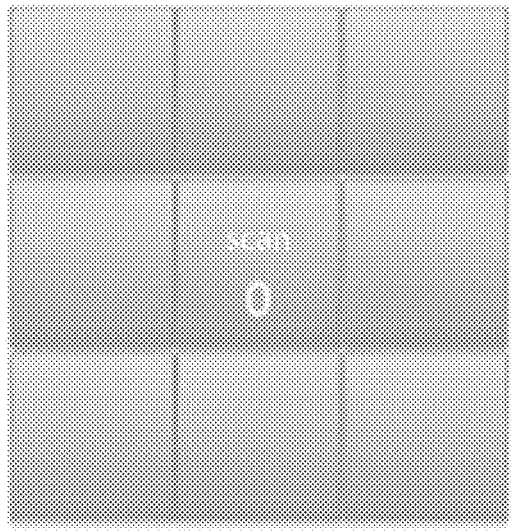
FIGS. 11a-i and l-n show the updating of the RVM map according to the disclosure method.
Figure 11B:
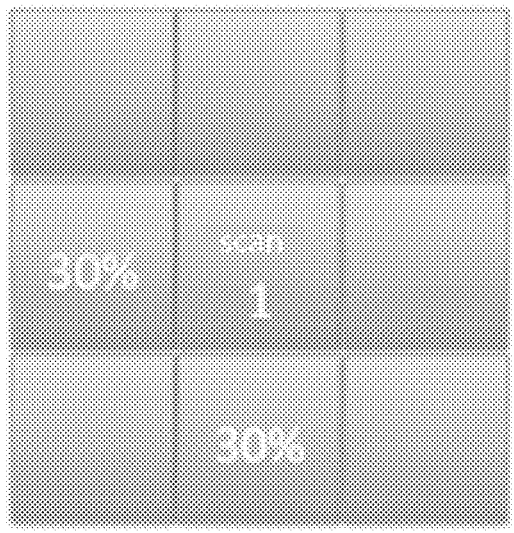
Figure 11C:
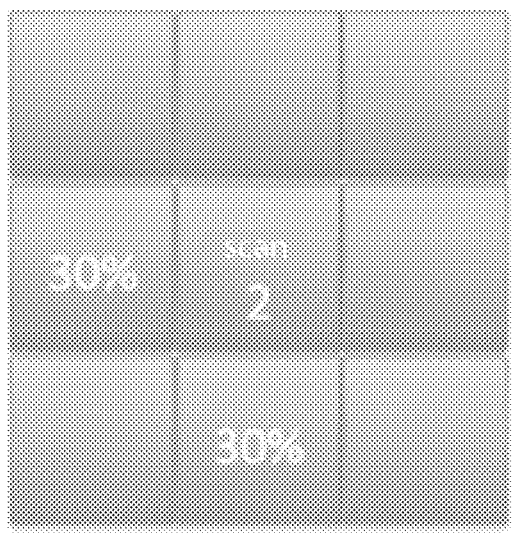
Figure 11D:
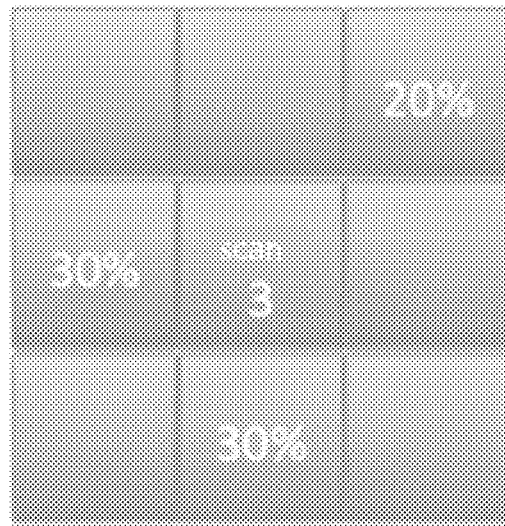
Figure 11E:
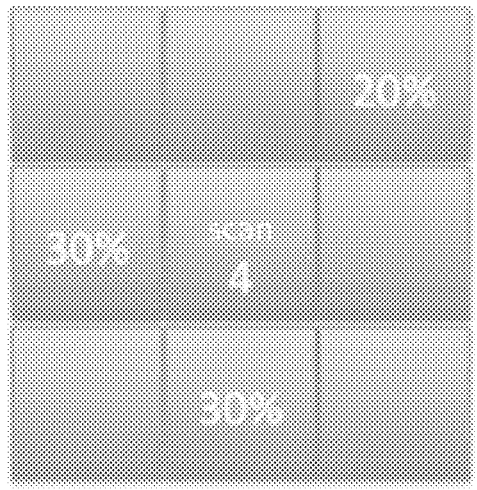
Figure 11F:
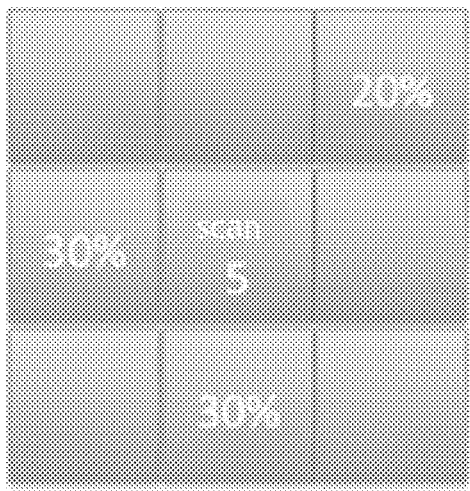
Figure 11G:
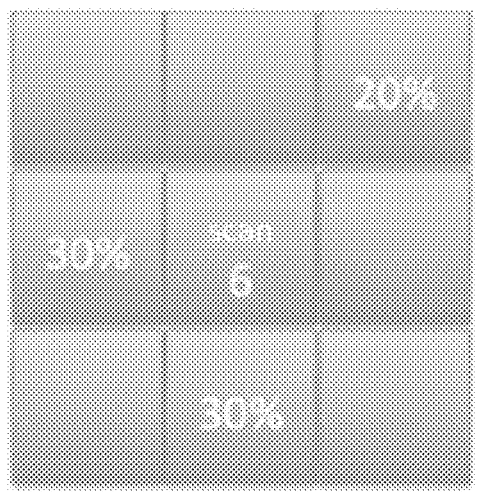
Figure 11H:
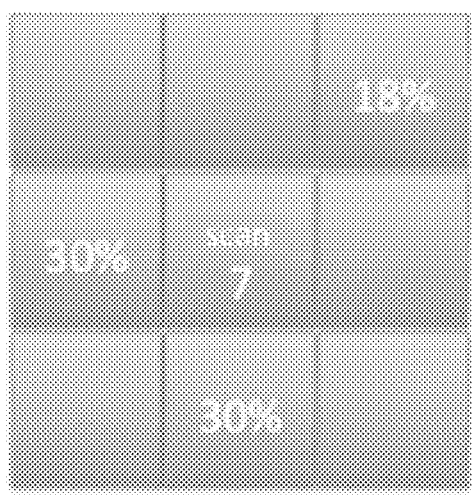
Figure 11I:
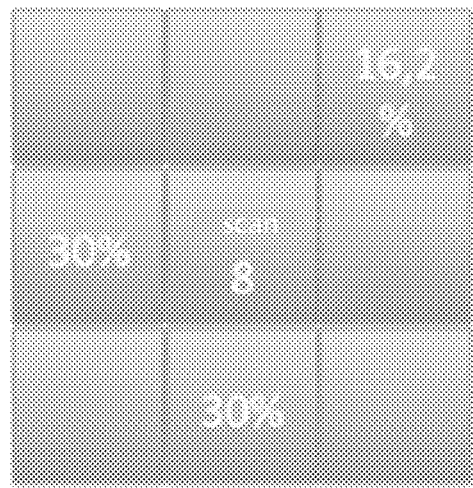
Figure 11L:
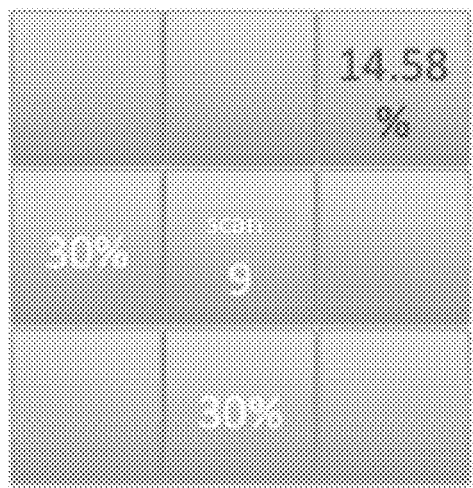
Figure 11M:
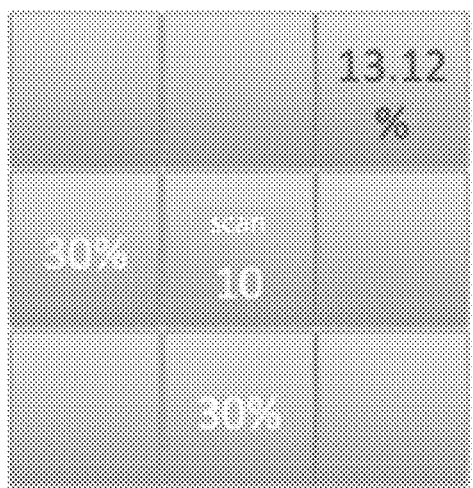
Figure 11N:
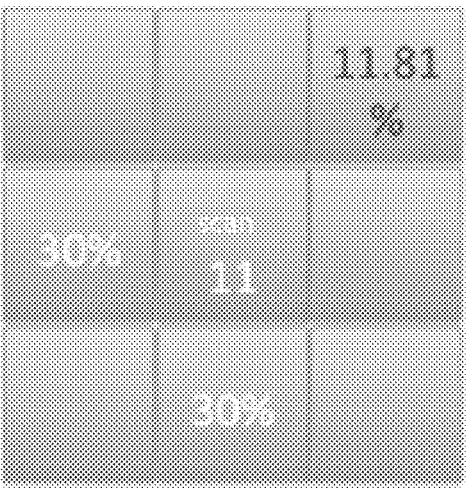

Let's represent the RVM maps evolution in the aforementioned scans. In FIGS. 11a-11n only for drawing simplicity RVM is depicted as a 3×3 matrix. In real cases it would represent the whole airspace covered by the radar, therefore, assuming a 256 Nautical Miles (NM) over 360° with a range resolution of $R_r$=30 m and an azimuthal encoding of 12 bit ($2^{12}$=4096), the RVM would have:
  256*1852/$R_r$ rows, where 1852 is the conversion factor from NM to meters;
  $2^{12}$ columns, each column representing an azimuthal step of 0.08°.

Since reflectors may change position or disappear (mobile cranes, environmental conditions due to snow), an algorithm is needed that allows the RVM to "forget" (which is also called "RVM discharge") the false tracks position.

This is achieved by averaging the cluster received power value to be stored in each cell of the RVM with the one already present in the cell. That is, being:
  $P_r^{n-1}$ the power value stored in the RVM i-th cell and relevant to the scans up to n−1;
  $P_r$ the power value for the cluster received in the current scan in the i-th cell;
  $P_r^n$ the power value stored in the RVM at the current scan in the i-th cell;
Then the following is performed:

$$\text{If } P_r \geq P_r^{n-1} \rightarrow P_r^n = P_r$$

$$\text{Else } P_r^n = \alpha P_r + (1-\alpha) P_r^{n-1}$$

Note that α value (<1) determines the "memory" of the method according to the disclosure about cell average power that influences the false track initiation probability. α value is configurable to meet traffic density, environment changing rate etc.

The following table gives the results in a specific case for α=0.4 when a 20% and then a 30% signal is received in the i-th cell (scan 3 to 5 and 12 to 16). Values are given in percentage of the maximum power value (typically 22 dbm). The table also includes an $α_r$ value whose meaning is described in the following paragraph.

TABLE 2

| | α 0.40 | | |
| | $α_r$ 0.01 | | |
| Scan | Pr | Prn − 1 | Prn |
| --- | --- | --- | --- |
| 1 | 0.00% | 0% | 0.00% |
| 2 | 0.00% | 0% | 0.00% |
| 3 | 20.00% | 0% | 20.00% |
| 4 | 20.00% | 20% | 20.00% |
| 5 | 20.00% | 20% | 20.00% |
| 6 | 0.00% | 20% | 12.00% |
| 7 | 0.00% | 12% | 7.20% |
| 8 | 0.00% | 7% | 4.32% |
| 9 | 0.00% | 4% | 2.59% |
| 10 | 0.00% | 3% | 1.56% |
| 11 | 0.00% | 2% | 0.93% |
| 12 | 30.00% | 1% | 30.00% |
| 13 | 30.00% | 30% | 30.00% |
| 14 | 30.00% | 30% | 30.00% |
| 15 | 30.00% | 30% | 30.00% |
| 16 | 30.00% | 30% | 30.00% |
| 17 | 0.00% | 30% | 18.00% |
| 18 | 0.00% | 18% | 10.80% |

3.3 RVM Description—False Track Communication

In the aforementioned scenario, we have assumed that a false track is initiated and terminated in the same cell. Of course this will not be always the case in real life application. Therefore, according to the disclosure, in the real life application the radar tracker shall inform the system about the "initiation" position of a track that has been identified as false (and possibly even the series of cells crossed by the false track), i.e. that matches the false track identification criteria.

Once a track has been identified as false, tracker will communicate this occurrence to the system according to the disclosure along with its initiation position and the corresponding cell will be marked as "likely to originate false tracks". From this moment on, α value will be set to a different value $α_r$. Note it is typically $α_r<α$ to increase algorithm memory of the false track.

The following table illustrates the difference when the new $α_r$ value is applied to the cell. Note that the "decay" time of the average power is longer than before.

TABLE 3

| | α 0.40 | | |
| | $α_r$ 0.01 | | |
| Scan | Pr | Prn − 1 | Prn |
| --- | --- | --- | --- |
| 1 | 0.00% | 0% | 0.00% |
| 2 | 0.00% | 0% | 0.00% |
| 3 | 20.00% | 0% | 20.00% |
| 4 | 20.00% | 20% | 20.00% |
| 5 | 20.00% | 20% | 20.00% |
| 6 | 0.00% | 20% | 12.00% |
| 7 | 0.00% | 12% | 7.20% |
| 8 | 0.00% | 7% | 4.32% |

TABLE 3-continued

| | α 0.40 | | |
| | $α_r$ 0.01 | | |
| Scan | Pr | Prn − 1 | Prn |
| --- | --- | --- | --- |
| 9 | 0.00% | 4% | 2.59% |
| 10 | 0.00% | 3% | 1.56% |
| 11 | 0.00% | 2% | 0.93% |
| 12 | 30.00% | 1% | 30.00% |
| 13 | 30.00% | 30% | 30.00% |
| 14 | 30.00% | 30% | 30.00% |
| 15 | 30.00% | 30% | 30.00% |
| 16 | 30.00% | 30% | 30.00% |
| 17 | 0.00% | 30% | 18.00% |
| 18 | 0.00% | 18% | 10.80% |
| 19 | 0.00% | 11% | 10.69% |
| 20 | 0.00% | 11% | 10.59% |
| 21 | 0.00% | 11% | 10.48% |
| 22 | 0.00% | 10% | 10.37% |
| 23 | 0.00% | 10% | 10.27% |
| 24 | 0.00% | 10% | 10.17% |
| 25 | 0.00% | 10% | 10.07% |
| 26 | 0.00% | 10% | 9.97% |
| 27 | 0.00% | 10% | 9.87% |
| 28 | 0.00% | 10% | 9.77% |
| 29 | 0.00% | 10% | 9.67% |
| 30 | 0.00% | 10% | 9.57% |

3.4 RVM Description—Cell Reset

The cell is "reset", i.e. it is marked again as "unlikely to originate false tracks", when the average power value decreases to 0. The following table illustrates this procedure (the rows can be considered the final part of the previous table which has been cut for illustration purpose):

TABLE 4

| 767 | 0.00% | 0% | 0.01% |
| --- | --- | --- | --- |
| 768 | 0.00% | 0% | 0.01% |
| 769 | 0.00% | 0% | 0.01% |
| 770 | 0.00% | 0% | 0.01% |
| 771 | 0.00% | 0% | 0.01% |
| 772 | 0.00% | 0% | 0.01% |
| 773 | 0.00% | 0% | 0.01% |
| 774 | 0.00% | 0% | 0.01% |
| 775 | 0.00% | 0% | 0.01% |
| 776 | 0.00% | 0% | 0.01% |
| 777 | 0.00% | 0% | 0.01% |
| 778 | 0.00% | 0% | 0.01% |
| 779 | 0.00% | 0% | 0.01% |
| 780 | 0.00% | 0% | 0.01% |
| 781 | 0.00% | 0% | 0.01% |
| 782 | 0.00% | 0% | 0.00% |
| 783 | 0.00% | 0% | 0.00% |
| 784 | 0.00% | 0% | 0.00% |
| 785 | 0.00% | 0% | 0.00% |
| 786 | 0.00% | 0% | 0.00% |
| 787 | 0.00% | 0% | 0.00% |
| 788 | 0.00% | 0% | 0.00% |
| 789 | 0.00% | 0% | 0.00% |

3.5 RVM Description—Probability of False Track

Finally, every time a new plot is sent to the tracker, the system according to the disclosure checks if the relevant cell has a probability to originate false tracks and, if so, informs the tracker to take this into account.

The tracker will then raise the initiation thresholds for that particular plot in order to prevent false tracks creation.

Probability is calculated as a percentage of the average power stored in the cell:

$$P_{ft} = bP_r^n$$

wherein b is a configurable parameter.

3.6 System Behavior in the Scenario.

FIGS. 11a-11n summarize the evolution in time of the RVM 3×3 matrix as a consequence of the scenario above described.

In scan 1 (FIG. 11a) there is no plot, in scan 2 (FIG. 11b) $P_A^1$ and $P_B^1$ are the extracted plot, which persist till (last) scan 11 (FIG. 11n). In scan 4 plot $P_{AR}^3$ appears and persist till scan 6 (FIG. 11g) when it is found that the track generated by such a plot is found to be a false track.

From scan 7 (FIG. 11h) on, the power of the third plot $P_{AR}^3$ diminishes (or in general varies) so that in scan 9 only the plots relevant to targets A and B are initialised, while maintaining memory of the fact that in cell (1,3) a false track (C) appeared, according to the above description.

The innovation contribution of the algorithm according to the disclosure lies in the proposed analysis technique: indeed it is not based only on the comparison of replies, according to what is made by the extraction processes that are typically used in the radar sensors, nor on the only "scan-by-scan" correlation, according to what the tracking algorithms do, but on the global information from the extraction/tracking process. Furthermore, the ADS-B contribution is also integrated, if present. Therefore the algorithm is transversal with respect to the traditional architecture of the radar systems and represents the application of a more general methodology of characterisation of the surrounding environment.

Coming back on the method of above-mentioned document US20020180631, even neglecting the problem of cancelling the aircrafts tracks relevant to mode S with the same conspicuity code, such a method is based on the estimation of the physical position of the reflector. However, an estimation made on the basis of a single detection event relevant to a real target with respect to a reflector would be different from an estimation of another event generated by the same reflector but relevant to another real target, due to the actual different positions of the real targets. Therefore there is a high uncertainty about the position of the reflector, hindering an effective prevention of false tracks. This is why the present disclosure does not attempt to estimate the actual position of reflectors, but concentrates on determination of the probability to have false tracks within a predetermined area (cell), irrespective of where the reflector is actually placed. This has the effect of a dynamical monitoring (and then cancelation) of false tracks within short time spans even in the case of limited air traffic to be monitored. Indeed, the prior art method fails to rapidly calculate the reflector position where only few reflections occur (small airports).

The examples set forth above are provided to give those of ordinary skill in the art a complete disclosure and description of how to make and use the embodiments of the Mode S anti-reflection algorithm for eliminating false tracks due to reflected replies in ground radar systems of the disclosure, and are not intended to limit the scope of what the inventors regard as their disclosure. Modifications of the above-described modes for carrying out the disclosure can be used by persons of skill in the art, and are intended to be within the scope of the following claims.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications can be made without departing from the spirit and scope of the present disclosure. Accordingly, other embodiments are within the scope of the following claims.

The preferred embodiments have been above described and some modifications of this disclosure have been suggested, but it should be understood that those skilled in the art can make variations and changes, without so departing from the related scope of protection, as defined by the following claims.

What is claimed is:

1. Computer-implemented method for eliminating false Mode S SSR or 3A code tracks on radar display created by a radar extractor having a radar extractor computer processor of a radar as a consequence of false replies, i.e. replies reflections against reflectors, a reflector being natural or artificial object different from an aircraft target, the radar comprising the radar extractor having a computer processor and a radar tracker, the method being characterised by the execution of the following steps:

A. Creating a raw video map, that is extended to the area covered by the radar and is subdivided into cells of predefinable dimensions, each cell delimiting a portion of the area wherein an aircraft target can be present, to each cell being associated a probability of presence of false replies in such a cell;

B. For a situation corresponding to a scan by the radar, the radar extractor computer processor executes the following sub-steps;

B0. Identifying replies clusters, i.e. two or more replies sets closer to each other in azimuth and range than corresponding predefined threshold values;

B1. Associating to each cell of the raw video map a power level received by the radar in the corresponding area portion;

B2. Extracting the plots, i.e. replies cluster average points determined in case a replies set has a number of replies greater than a pre-defined threshold otherwise no replies cluster average points are determined and the method starts again from B0;

B3. Sending the extracted plots to the radar tracker along with said probability of presence of false replies in the cells to which they respectively belong;

B4. Calculating, by means of the radar tracker computer processor, the tracks generated along time by each plot, updating the already existing tracks on the radar display and initiating new tracks using by driving Cartesian axes, a robot arm, a lens system and one or more galvanometric head reflecting mirrorsof presence of false replies calculated in step B3;

C. With respect to the all tracks of step B4, determining, by means of the radar tracker, false tracks and their initial points;

D. On the basis of the initial points of the false tracks determined in step C, calculating by the radar extractor computer processor the probability of presence of said false replies in the cells corresponding to said initial points and updating the raw video map of step A;

E. Repeating steps B-D.

2. Method according to claim 1, characterised in that in step B4 a track initiation threshold is used, which is a pre-defined number of correlating consecutive plots, said track initiation threshold being an increasing function of said probability of presence of false replies calculated in step B3.

3. Method according to claim 1, characterised in that the power level associated to each cell in step B1 is determined by the intensity of the reply signal within the cell, said probability of presence for the cell being calculated over multiple radar scans as:

$$E\{P^i_{Rx} * N_{scan\ with\ reflection} / P_{MAX} * N_{scan\ TOT}\}$$

wherein:

$N_{scan\ with\ reflection}$ is the number of radar scans for which false tracks have been determined in the cell in step C;

$N_{scan\ TOT}$ is the number of multiple radar scans;

$P^i_{RX}$ indicates the power of the signal received from the i-th reply falling in the cell, with i=1,...k where k is the total number of replies in the cell and depends on the geographical extension of the same cell;

$P_{mAx}$ indicates the highest power receivable from the cell;

And wherein E { } indicates an average operation executed on the replies in the cell.

4. Method according to claim 1, characterised in that said probability of Presence in each cell is calculated as a percentage of the current average power stored in the cell $P_r^n$:

$$P_{fi} = bP_r^n$$

wherein b is a configurable parameter.

5. Method according to claim 1, characterised in that in B1, for each cell, the power level received in the current scan $P_r$ is averaged with a power level $P_r^{n-1}$ already associated to the cell, and an averaged value $P_r^n$ is currently associated to the cell, according to the following:

$$\text{If } P_r \geq P_r^{n-1}, \text{ then } P_r^n = P_r$$

$$\text{Else } P_r^n = \alpha P_r + (1-\alpha) P_r^{n-1}$$

Wherein α is a real number weight, equal for all cells, parametrising a "memory" of cell average power that affects the one or more track initiation thresholds in step B4, the value α being suitable to be pre-set to meet changing detection situations such as traffic density and environment changing speed, and, once a track has been identified as false in step C, α value will be set to a different value $\alpha_r < \alpha$ to increase algorithm memory of the false track.

6. Method according to claim 1, characterised in that in step C the radar tracker determines false tracks on the basis of one or more pre-defined criteria, a false track being determined when a track:

has an unsteady trajectory defined by a variance of the range and/or azimuth speed larger than a pre-defined threshold;

is chosen out of two tracks having the same Mode S address and maneuvering at the same time, wherein maneuvering condition is estimated according to the innovation energy criterion of the Kalman filtering, by calculating the range distance between the two tracks and using following choice criteria:

if said range distance is larger than a pre-defined range distance threshold, particularly radar range accuracy, the track with the largest range distance is chosen;

otherwise the track is chosen that is the first track terminated in time;

The false track is the one of two tracks having the same mode S address, for which the roll call interrogations do not succeed;

Is chosen by an operator who manually inputs information in the radar tracker about which one of the tracks are false tracks.

7. Method according to claim 1, characterised in that during step D, the radar tracker communicates the initial points of the false tracks individuated in step C to the radar extractor, which carries out the calculation of probability of presence.

8. Method according to claim 1, characterised in that, during step A, when the system ADS-B is at disposal, in case an ADS-B plot is present which is correlating in position with a SSR plot, all the remaining plots will be marked as reflections and the relevant cells of the raw video map will be marked with probability 100%.

9. A computer program product comprising a non-transitory computer usable medium having control logic stored therein for causing a computer to execute steps A-E of the method for eliminating false Mode S SSR or 3A code tracks on radar display created by a radar extractor as a consequence of the false replies, according to the method of claim 1.

10. Non-transitory tangible memory medium readable by a computer, having a program memorized on it, characterised in that the program is the computer program according to claim 9.

11. System for eliminating false Mode S SSR or 3A code tracks on a radar display created by a radar extractor as a consequence of false replies, the system being characterised in that it comprises means to execute the method according to claim 1, the system comprising:

a radar extractor computer processor including electronic means configured to perform steps A, B0-B3, D;

a radar tracker computer processor including electronic means configured to perform steps B4, C.

* * * * *